Patented Jan. 4, 1938

2,104,077

UNITED STATES PATENT OFFICE 2,104,077

AQUEOUS EMULSION OF WATERPROOFING MATERIAL

Edwin O. Groskopf, Rutherford, N. J., assignor to The Patent and Licensing Corporation, New York, N. Y., a corporation of Massachusetts No Drawing. Application March 9, 1935, Serial No. 10,325

12 Claims. (Cl. 134—1)

This invention relates to improvements in aqueous emulsions of materials normally immiscible with water and is more particularly concerned with improvements in such emulsions of solid or semi-solid bitumen or of rubber, or of mixtures of solid rubber and bitumen or of mixtures of the emulsions of solid rubber, rubber latex and bitumen.

In its more specific aspects the invention is concerned with improvements in the production of bituminous emulsions utilizing bentonite or bentonite-like material including colloidal silicates as the emulsifying agent for the bitumen.

Asphaltic emulsions have been made with bentonite as the emulsifying agent for a number of years. These bentonite emulsions of asphalt possess numerous desirable advantages, among which is the ability of the emulsified asphalt particles to remain indefinitely in suspension due to the peculiar properties of bentonite as distinguished from other mineral powder type emulsifying agents. Emulsions made with bentonite also have the advantage that they can be applied satisfactorily to a surface by brushing or spraying, the emulsions being viscous and more or less syrupy and having desirable so-called "leveling" qualities. Still another advantage of this type of emulsion is that the dried water-free film is highly resistant to flow under heat even at temperatures greatly exceeding the melting point of the asphalt contained therein. In consequence of these and other advantages which they possess, asphalt emulsions made with bentonite or bentonite-like material as the emulsifying agent have found wide use in various arts. By the term "bentonite-like material" I mean to include any material which has the distinguishing characteristics of bentonite in respect of its suitability for emulsifying bitumen or the like, in that the material is extremely slimy when wet, requires a large amount of water to produce plasticity, has great viscosity when suspended in water, has the ability to emulsify a relatively high proportion of bitumen or the like, and produces emulsions in which the emulsified particles remain indefinitely in suspension, and which said emulsions can be applied satisfactorily by brushing or spraying, and the water-free film of which is highly resistant to flow under heat even at temperatures greatly in excess of the melting point of the bitumen contained therein.

These emulsions however possess the disadvantage that the water-free films thereof, after they are dried for a short period of time, say 24 to 48 hours, show a marked tendency to re-emulsify upon prolonged contact with or submersion in distilled or tap water. This tendency constitutes a serious drawback to the use of these emulsions under conditions in which the dried film is brought into prolonged contact with, or is submerged in, water after a drying period of only say 24 to 48 hours. It appears that this re-emulsification is due to the fact that upon prolonged contact with or submersion in water the freshly dried film absorbs water and causes the bentonite contained in the film to swell, owing to the colloidal character of the bentonite. The extent to which re-emulsification may proceed under such conditions, and consequently, the protection afforded by the dried film of the emulsion, varies greatly according to conditions prevailing in the initial stages after the film has been dried. Where the films are exposed to the atmosphere and are warmed by the sunlight and only occasionally wetted with water, the asphalt particles gradually coalesce more completely through the interstitial walls of the bentonite and very little re-emulsification occurs when the film is subsequently subjected to contact with water. But where the initial dried film is continually wetted with water or where enough moisture is present to cause the bentonite to take up moisture it will, on account of its colloidal properties, re-emulsify the asphalt in the film.

The foregoing disadvantage of bentonite emulsions has been observed for some considerable time and numerous efforts have been made to eliminate it. Thus, for example, it has been proposed to treat bentonite emulsions with lime or Portland cement for the purpose of transforming the bentonite contained therein into an irreversible colloid.

Emulsions of asphalt made with bentonite as the emulsifying agent have been treated with lime with the result that the water-free film of the treated emulsion even when freshly dried is not only no longer re-emulsifiable upon contact with water, but is so impermeable that it adheres tenaciously to glass and to steel surfaces, showing no perceptible tendency to disintegrate after long periods of immersion. Apparently the lime reacts upon the bentonite and converts it to a condition in which the bentonite is no longer capable of being swelled by water when a film of the emulsion is dried. However, in treating the bentonite emulsion with lime, the latter re-acts with the bentonite and causes the dispersed particles to flocculate severly. This severe flocculation causes the dispersed asphalt particles to settle out badly in the drums or other containers and the emulsion thickens and becomes so granular that it can be returned to a brushing consistency only with great difficulty by the addition of water accompanied by stirring action. Even when thus restored to a brushing consistency the product exhibits a false, watery body such that it becomes difficult or impossible to brush the material onto a surface in a uniform protective coating of substantial thickness. The film has little or none of the desirable leveling qualities and is streaked with the marks of the brush.

The principal object of my invention is to produce emulsions of the type described wherein bentonite or bentonite-like material is employed as the emulsifying agent but in which the bentonite contained in the emulsion is transformed into an irreversible condition, so that the dried films of the emulsion will have no tendency to re-emulsify; and specifically, to provide a treatment of this character without deleteriously affecting the suspendibility characteristic of emulsions as normally made with bentonite as the emulsifying agent, while at the same time improving the "body" and film leveling qualities thereof.

A further object of the invention is to provide a treatment of the character described wherein one of the agents employed for accomplishing the broader objects thereof may be utilized to control the "body" characteristics of the finished emulsion.

In its preferred form the invention comprises utilizing appropriate quantities of casein or casein-like materials in conjunction with the bentonite employed as the emulsifying agent for the asphalt or the like, and adding to the emulsion thus formed, appropriate quantities of metallic oxides or hydroxides, preferably an alkaline earth oxide or hydroxide such as hydrated lime, capable of reacting with the bentonite to convert it into an irreversible colloid.

The casein may be combined with the bentonite used as the emulsifying agent in varying quantities, but I find that desirable proportions will range from 15% to 50% by dry weight of casein based on the weight of the bentonite. Hot water is added to the bentonite and casein, and the mixture is stirred as a thick paste. The alkaline content of the bentonite tends to swell the casein and bring it into a smooth colloidal condition. In this aqueous paste or suspension of the mixture of bentonite and casein the bentonite appears to be made more smooth and unctuous by the action of the casein. The aqueous suspension or paste of the casein and bentonite may then be used to emulsify asphalt or the like according to commonly known methods of manufacturing emulsions of the bentonite type.

Where the amount of casein employed is such that the alkali available in the bentonite is inadequate to swell the casein, a small amount of alkaline substance such as sodium, potassium or ammonium hydroxide may be used to accomplish the swelling of the casein. It is to be noted also that the acidic character of the casein adjusts the pH of the bentonite so that the mixture emulsifies the asphalt more satisfactorily than does the bentonite alone.

The amount of lime added to the emulsion as made with the mixture of bentonite and casein is preferably equal to the amount of bentonite contained in the emulsion. At least it appears that such an amount of lime is necessary in order to effectively react with the bentonite and convert it into a condition where the dried film of the finished emulsion will not re-emulsify upon contact with water.

By the practice of the process as above described I have been able to produce emulsions of asphalts of a hardness extending over a considerable range, varying from asphalts having a melting point of 110° F. and a penetration of 110 to 120 at 77° F. to asphalts having a melting point of 185° F. and a penetration of 10 to 12 at 77° F. The finished emulsions as thus produced may have an average composition of approximately 50 to 55% asphalt, 1 to 3% bentonite, 0.125 to 1.0% casein, 1 to 4% lime, and 40 to 45% water. These emulsion products possess not only complete suspendibility but superior brushing or film leveling qualities than those characteristic of bentonite emulsions as usually made. Furthermore, as distinguished from ordinary bentonite emulsions, the products made in accordance with my invention produce water-free films which are irreversible or impermeable, and adhere tenaciously to metal and glass surfaces even under prolonged soaking in water, resulting in great improvement in the protection that they afford against corrosion. In respect of suspendibility, it may be stated that batches of emulsion made in accordance with my invention, and placed in storage in regular 55 gallon drums, have remained perfectly suspended for prolonged periods of time, such that to all practical intents and purposes they may be considered as remaining suspended indefinitely. This is in remarkable contrast to ordinary emulsions made with bentonite and treated with lime or the like, in which latter type of emulsion the particles are badly flocculated and settle out and pack at the bottom of the drums.

Furthermore, the alkalinity of the finished product due to the presence of the lime is such as not only to prevent the film from reacting with metal but actually to inhibit corrosion, evidently as a result of the shift in pH of the emulsion by the lime from about pH 7.5 to pH 11.5.

Still further, the products produced in accordance with the invention exhibit no tendencies to flocculate by further additions of lime and cement. The significance and practical value of this property will be stated more fully hereinbelow in discussing certain uses to which the emulsions may advantageously be applied.

While I do not desire to be limited to any particular theory underlying the invention, tests which I have made both on the finished emulsion, and on the same system omitting the asphalt, have led to certain observations which are here offered in explanation of the invention.

The addition of lime to bentonite sol immediately produces flocculation and settling and when this lyophilic colloid is dehydrated it is converted into an irreversible colloid.

The addition of aqueous lime to casein sol, however, forms di-calcium caseinate, a colloid which is not flocculated by an excess of lime and remains in perfect suspension. This characteristic is one of the distinguishing factors determining the suitability of the colloid to be employed in conjunction with the bentonite in carrying out my invention.

Since the casein re-acts with only 0.82% of lime ($Ca(OH)_2$) to form di-calcium caseinate, there is always present a sufficient excess of lime to render the bentonite irreversible. In fact, practically all of the lime is left to combine with the bentonite and render it irreversible. Di-calcium caseinate has a molecular weight of about 8900 compared to probably not more than 400 for the reaction product of lime and bentonite. Therefore, when lime or other alkaline earths in excess are added to an aqueous suspension of casein and bentonite, the lime re-acts with both the bentonite and the casein, producing non-flocculated di-calcium caseinate colloidal particles and flocculated limed bentonite.

Hence when these components are thus utilized as above described in producing an emulsion of asphalt or the like, the calcium caseinate which is unflocculatable in the presence of excess of lime, maintains the flocculated limed bentonite in suspension and if the amount of calcium caseinate (which is somewhat reversible on drying) is sufficiently small, the irreversibility of the system, on drying, is not impaired. On the other hand, the amount of calcium caseinate must be sufficiently large that while preserving the foregoing condition, the non-flocculated calcium caseinate colloid will maintain the system in suspension and in a relatively bodied condition. Nevertheless such a small amount of calcium caseinate is required to suspend and body the emulsion and the calcium caseinate wets the asphalt so well that the dried film appears to be as irreversible as when the casein is omitted.

I have further found that in the emulsions produced in accordance with my invention, the gelatinous character of the casein serves to keep the asphalt emulsion highly bodied. In fact, the casein is so effective in bodying the emulsion that a change of $\frac{1}{10}$ of 1% of casein imparts a definite change in degree of body of the emulsion. Thus, by slight variations in the amount of casein employed it becomes possible to control the body of the finished emulsion so as to obtain level dried films of uniform thickness.

While I prefer in carrying out my invention to combine the casein with the bentonite and to use this mixture to emulsify the asphalt and thereafter adding the lime to the emulsion, the unique properties of the product may also be obtained by first emulsifying the asphalt with bentonite and adding to the emulsion thus produced a properly swelled solution of the casein followed by the addition of the required amount of lime. In such case however somewhat larger quantities of casein are necessary. Thus where the emulsion contains approximately 50% of asphalt made with 2% of bentonite, it is necessary to add 1½ to 2% of casein so that when 2% of lime is added, the emulsion will remain in suspension and be satisfactorily bodied.

Since casein is an organic material subject to putrefaction it is necessary to employ a preservative and for this purpose I have found it advantageous to use beta naphthol. This re-agent when used in amounts approximating 5% by weight of the casein present in the emulsion has been found to serve effectively as a preservative for the casein without deleteriously affecting the desirable properties of the other components of the system as herein described. Samples of the emulsion made in accordance with the invention and containing beta naphthol as a preservative in the amounts specified have been permitted to age for periods up to four months and have been found to be free of putrefaction although some hydrolysis of the casein occurs with slight liberation of ammonia. Beta naphthol is in this connection more advantageous than formaldehyde since the latter reacts with the casein and thus requires greater amounts of casein for the protection of the bentonite contained in the emulsion and for maintaining the highly bodied characteristics thereof.

One of the uses to which asphalt emulsions have been put is for the production of mastic floorings by mixing the emulsion with Portland cement and sand or similar aggregate. The emulsions made in accordance with my invention show considerable advantage as compared with emulsions ordinarily made with bentonite when used for producing mastic flooring compositions. Among the advantages of this emulsion when used for this purpose is that the flooring composition exhibits definitely lesser tendency to shrinkage and crackage; the flooring composition sets faster and the finished flooring is markedly harder; the wet aggregate requires considerably less water to be brought to the same toweling consistency when the emulsion is mixed therewith than is the case with ordinary asphalt emulsions made with bentonite. Less work is required to mix the emulsion and the aggregate since the emulsion has already been completely re-acted upon by the lime and the addition of further lime (in the form of Portland cement) has very little if any effect upon it as soon as the dried cement becomes wet.

Asphalt emulsions are also used in combination with cement such as Portland cement or in combination with cement and sand to produce very water-resistant films which at the same time become very hard and abrasion-resistant, this type of coating being required for example for pipe line protection and similar uses where the film must bond firmly to the metal, be impervious to moisture and be so hard and tough as to be highly resistant to abrasion from stones and other mechanical influences.

This invention is of considerable advantage as compared to emulsions ordinarily made with bentonite or emulsions made with bentonite and lime for this purpose.

For instance, when emulsion of bitumen, bentonite and water is mixed in the proportions of 400 parts by volume of emulsion and 100 parts by volume of Portland cement, 200 parts by volume of additional water are required to bring the mixture to a brushing consistency, compared to 50 parts by volume of water when the emulsions as herein described are used. The lower additional amount of water required, produces an emulsion after the addition of the Portland cement containing 10% more solids. This increased amount of solids, since it does not increase the thickness of the mixture, imparts more body to the product and a smooth film of a more substantial thickness can be brushed or sprayed onto a surface in one application than is the case when using bentonite or bentonite lime emulsions which do not contain the casein.

I claim:

1. An aqueous emulsion comprising waterproofing material dispersed in an aqueous vehicle containing bentonite-like material as emulsifying agent, said emulsion containing a reaction product of the bentonite-like material and an amount of alkaline earth reactant, sufficient to effectively render the bentonite-like material in the water-free film of the emulsion incapable of re-emulsifying the waterproofing material upon long contact with water, said emulsion also containing the reaction product of said reactant and casein in an amount varying from 12.5 to 50% by weight of the bentonite-like material, whereby the emulsion remains indefinitely suspendable and relatively highly bodied.

2. An aqueous emulsion comprising waterproofing material dispersed in an aqueous vehicle containing bentonite-like material as emulsifying agent, said emulsion containing a flocculated reaction product of the bentonite-like material and an amount of alkaline earth oxide, substantially equal to the amount of bentonite-like material and sufficient to render the bentonite-like material in the water-free film of the emulsion incapable of re-emulsifying the waterproofing material upon long contact with water, said emulsion also containing the reaction product of said alkaline earth oxide and casein in an amount varying from 12.5 to 50% by weight of the bentonite-like material, whereby the emulsion remains indefinitely suspendable and relatively highly bodied.

3. An aqueous emulsion comprising bitumen dispersed in an aqueous vehicle containing bentonite as emulsifying agent, said emulsion containing a flocculated reaction product of the bentonite and an amount of alkaline earth oxide, at least equal to the amount of bentonite and sufficient to render the bentonite in the water-free film incapable of re-emulsifying the bitumen upon long contact with water, said emulsion also containing the non-flocculated reaction product of said alkaline earth oxide and casein in an amount varying from 12.5 to 50% by weight of the bentonite, whereby the emulsion remains indefinitely suspendable and relatively highly bodied.

4. An aqueous emulsion comprising bitumen dispersed in an aqueous vehicle containing bentonite as emulsifying agent, said emulsion containing the flocculated reaction product of the bentonite and an amount of lime substantially equal to the amount of bentonite and sufficient to render the bentonite in the water-free film of the emulsion incapable of reemulsifying the bitumen upon long contact with water, said emulsion also containing the non-flocculated reaction product of lime and casein in an amount varying from 12.5 to 50% by weight of the bentonite, said latter reaction product being present in quantities sufficient to enable the emulsion to remain indefinitely suspendable but insufficient to impair the irreversibility of the water-free film of the emulsion.

5. An aqueous emulsion of bitumen comprising bentonite-like material as the emulsifying agent and containing alkaline earth oxide in quantities substantially equal to the quantity of said emulsifying agent and sufficient to render the water-free film of the emulsion impermeable to water, said emulsion also containing the reaction product of said alkaline earth oxide with casein in amounts varying from 12.5 to 50% by weight of the bentonite-like material and adequate to suspend and body the emulsion.

6. An aqueous emulsion of bitumen containing bentonite as the emulsifying agent and containing lime in quantities substantially equal to the amount of bentonite and sufficient to prevent the bentonite in the water-free film of the emulsion from re-emulsifying the bitumen and to render said film capable of adhesion to surfaces of metal and glass, said emulsion also containing the reaction product of said lime with casein in amounts varying from 12.5 to 50% by weight of the bentonite and adequate to suspend and body the emulsion.

7. An aqueous emulsion of bitumen comprising bentonite as the emulsifying agent and containing lime in amounts approximately equal to the amounts of the bentonite contained therein, said emulsion also containing the reaction product of said lime with an amount of casein varying from 12.5 to 50% by weight of the bentonite contained therein, whereby said emulsion will remain in suspension and retain good brushing characteristics over long periods of standing and produce a water-free film which is impermeable and not re-emulsifiable upon long contact with water.

8. An aqueous emulsion of bitumen comprising 50 to 55% of bitumen, 1 to 3% of bentonite, 0.125 to 1.5% casein, 1 to 4% of lime and the balance water, whereby said emulsion will remain in suspension over long periods of standing and produce a water-free film which is impermeable and not re-emulsifiable upon long contact with water.

9. The method which comprises producing an emulsion of waterproofing material in an aqueous medium containing bentonite-like material as emulsifying agent and casein in proportions of approximately 12.5 to 50% by weight of the bentonite-like material, and combining with said emulsion an alkaline earth reactant in quantities sufficient to render the bentonite-like material incapable of re-emulsifying the waterproofing material from a water-free film of the emulsion, said reactant also reacting with the casein to produce a reaction product to preserve the emulsion in suspension and in highly bodied condition.

10. The method which comprises producing an emulsion of bitumen in an aqueous medium containing bentonite as emulsifying agent and casein in proportions of approximately 12.5 to 50% by weight of the bentonite, and combining with said emulsion an alkaline earth oxide in quantities substantially equal to the amount of bentonite contained therein and sufficient to render the bentonite incapable of re-emulsifying the bitumen from a water-free film of the emulsion, said oxide also reacting with the casein to produce a reaction product to preserve the emulsion in suspension and in highly bodied condition.

11. The method which comprises producing an emulsion of bitumen in a aqueous medium containing bentonite as emulsifying agent and casein in amounts varying from 12.5 to 50% by weight of the bentonite, and treating said emulsion with lime in quantities substantially equal to the amount of bentonite contained therein and sufficient to render the bentonite incapable of re-emulsifying the bitumen from a water-free film of the emulsion, said quantities of lime being such in relation to the amount of casein present that the reaction product thereof will be sufficient to preserve the emulsion in suspension but insufficient to impair the irreversibility of the water-free film of the emulsion.

12. A method which comprises producing an aqueous suspension of bentonite admixed with casein in amounts varying from 15 to 50% by dry weight of casein based on the weight of the bentonite, emulsifying waterproofing material with said aqueous suspension, and treating the resultant emulsion with alkaline earth oxide in quantities at least equal to the amount of bentonite contained therein and sufficient to render the bentonite incapable of re-emulsifying the waterproofing material from a water-free film of the emulsion, said quantities of the alkaline earth oxide being such in relation to the amount of the casein present that the reaction product thereof will be sufficient to preserve the emulsion in suspension but insufficient to impair the irreversibility of the water-free film of the emulsion.

EDWIN O. GROSKOPF.